UNITED STATES PATENT OFFICE.

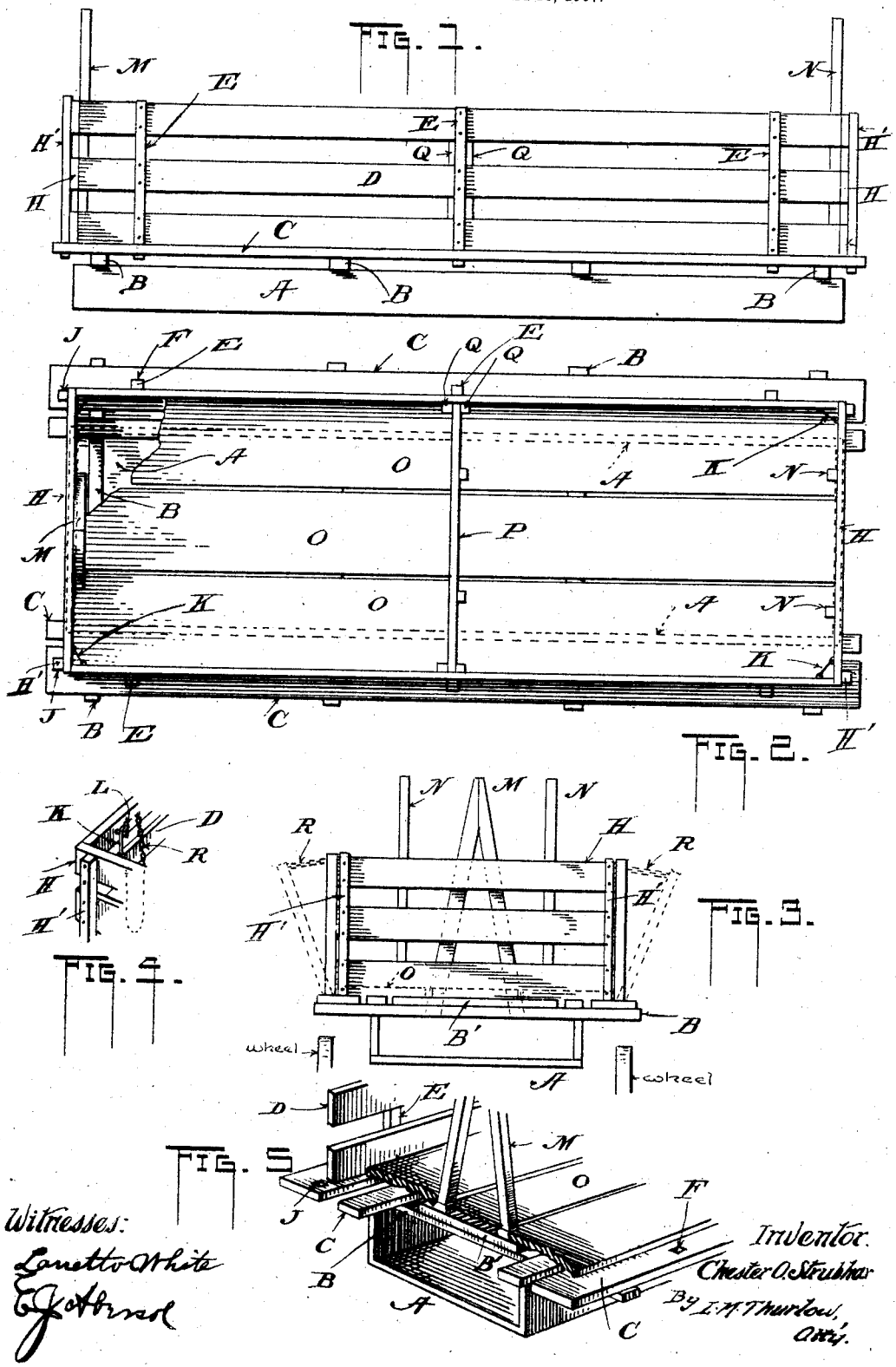

CHESTER O. STRUBHAR, OF WASHINGTON, ILLINOIS.

HAY AND HOG RACK.

No. 879,209.  Specification of Letters Patent.  Patented Feb. 18, 1908.

Application filed May 18, 1907. Serial No. 374,504.

*To all whom it may concern:*

Be it known that CHESTER O. STRUBHAR, a citizen of the United States, residing at Washington, in the county of Tazewell and State of Illinois, has invented certain new and useful Improvements in Hay and Hog Racks; and he does hereby declare that the following is a full, clear, and exact description of the invention, which will enable others skilled in the art to which it appertains to make and use the same.

This invention relates to a combined hog and hay rack for wagons, the same being also adapted for hauling fertilizer and other materials.

The object of the invention is to provide a peculiar arrangement of parts for wagons that may be changed in a few moments from a hay rack into a hog rack and vice versa, or from either one of these into a rack for holding various materials such, for instance, as fertilizers.

An object is to make a device for handling very large loads.

The invention relates also to certain details of construction as will be pointed out.

In my improved device I am enabled in a few moments to adapt it for hauling a load of hogs, or for a load of hay, or for trash, by the mere removal of, or introduction of certain parts or a slight change in position of other parts but this will be more clearly set forth hereinafter.

In the appended drawing, Figure 1 is a side elevation of my device. Fig. 2 is a top view of the same. Fig. 3 is an elevation of the front end. Fig. 4 is a perspective view of one corner of the device showing a hook for locking the side and end of the rack together and also a chain for use in sustaining the sides of the rack in an open position. Fig. 5 is a perspective view of the front of the device showing a removable floor.

A indicates a wagon box or body of the desired dimensions, having cross members B placed thereupon at intervals throughout its length whose ends extend beyond the side of the box for considerable distance, these being above the wheels so as to extend beyond and clear them as shown in Fig. 3. Lying upon the extremities of these members B, outside the wagon box, are longitudinal members C of which there may be one or several as desired. The members B may be of any desired length so as to have the members C extend any distance beyond the said wagon box making the device very wide above the box A. Mounted on the members C are sides and ends, the first composed of strips D carried by vertical members E whose lower ends are let into holes F through the members C, one of these holes being shown in Fig. 5. The ends of the rack are formed in similar manner by the members H carried by the upright members H' which correspond to the members E just described, said members H' entering holes J also in the members C. The members E and H' by being seated in the holes provided for them serve to locate the sides and ends of the rack and positively hold them in position. At the inner corners of the sides and ends are hooks K, one end being carried by means of an eye the other end hooking into an eye or staple L as shown in Fig. 4. This serves to lock the side and end members together.

At the front end of the wagon is erected the usual A-shaped frame member M, and at the rear ends are the members N. It will be seen that since the sides D of the rack are set out upon the members C which support them and are considerably outside the line of the wagon box A, I provide a large capacity for holding hogs. Where large floor space is desired for transporting hogs I employ a removable bottom indicated by O which may be a unit member or consist of several separate planks or boards; my object being, in either case, to provide a continuous floor the full width of the rack upon the members C. The inserted floor O is laid upon members B' secured to the pieces B each member B' serving to aid in supporting said floor together with the members C. Thus formed the hog rack is divided into two compartments by means of a central partition P constructed in any desired manner, as for instance, in the same manner as the end portions already described and this is supported between cleats Q secured to the inside of the members D as clearly shown in Fig. 2. Preferably I make the holes F in the members C a little larger than necessary so the members E of the sides D can tip or be slanted outward as shown by broken lines in Fig. 3 after removing the hooks K from the staples L. As shown in Fig. 4, I attach a chain R of the desired length to the side and end of the rack so that the sides D may open to the dotted lined position mentioned and then be held in that position as against any pressure from within the rack.

To constitute the ordinary hay rack it is only necessary to remove the sides and ends and take out the movable bottom O, or the latter may be left in place if desired as either way will answer.

If desired to form what is termed a "basket rack", the central partition P is removed; also the bottom O. Furthermore, if desired, the sides D are unlatched and permitted to occupy the dotted lined position thereby giving very large capacity and one man is alone enabled to pitch and handle a load of hay there being no necessity of having a man upon the wagon to arrange the load. By the basket rack as I arrange it, it gives very large capacity for the hay and the sides prevent the hay falling off after having been pitched upon the wagon.

For loading a quantity of trash or fertilizer the sides may be dropped to the position shown in dotted lines and the bottom O removed, thus giving very large capacity for this purpose.

I am not aware of a device of the peculiar combination shown and described herein and in bringing out the same I wish to retain the privilege of making such changes in the parts and arrangement as will fall within the spirit and intent of the invention.

Having thus described my invention, I claim:

1. In a combination hay rack and hog rack, a wagon box, a framing mounted on the top thereof and projecting beyond each side of the same and provided with slats extending parallel to the sides of the box, the box being open at its top, the sides mounted upon the said slats outside the position of the wagon box, the ends also mounted upon the slats and forming, together with the sides, an inclosure, and a removably inserted bottom for the rack, the same occupying a position upon the said slats and framing and forming a tight bottom for said rack and entirely covering the open top of the wagon box substantially as shown.

2. In a combination hay rack and hog rack, a wagon box, a framing mounted on the top thereof and projecting beyond each side of the same and provided with slats extending parallel to the sides of the box, the box being open at its top, the sides mounted upon the said slats outside the position of the wagon box, the ends also mounted upon the slats and forming, together with the sides, an inclosure and a removably inserted bottom for the rack, the same occupying a position upon the said slats and framing and forming a tight bottom for said rack and entirely covering the open top of the wagon box substantially as shown, and a space dividing member insertible in the rack and held by the sides when in their vertical position.

3. In a combination hay rack and hog rack, a wagon box, a framing mounted on the top thereof and projecting beyond each side of the same and provided with slats extending parallel to the sides of the box, the box being open at its top, the sides mounted upon the said slats outside the position of the wagon box, and adapted to occupy either a vertical or an outwardly inclined position, end portions for the rack, means for holding the sides in their vertical position to form a closed box, means for sustaining the sides when in the open or slanting position and a removable bottom for closing the open top of the wagon box, the same lying upon the slats described and entirely covering the space inclosed by the sides and ends substantially as set forth and described.

4. In a combination hay rack and hog rack, a wagon box, a framing mounted on the top thereof and projecting beyond each side of the same and provided with slats extending parallel to the sides of the box, the box being open at its top, the sides mounted upon the said slats outside the position of the sides of the wagon box, and adapted to occupy either a vertical or an outwardly inclined position there being holes in the slats, and bottom projections on the sides for entering the same to hold said sides in position at their bottoms, end portions for the rack, means for holding the sides in their vertical position to form a closed box, means for sustaining the sides when in the open or slanting position, a removable bottom for closing the open top of the wagon box, the same lying upon the slats described and entirely covering the space inclosed by the sides and ends, and a space dividing member insertible in the rack and held by the sides when vertically positioned.

In testimony whereof I affix my signature, in presence of two witnesses.

CHESTER O. STRUBHAR.

Witnesses:
J. C. HALDERMAN,
C. M. DUMNINGTON.